Patented Sept. 4, 1945

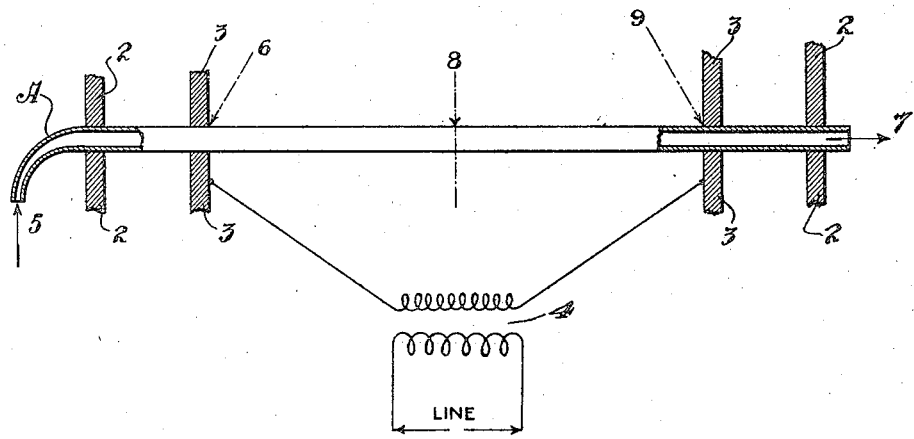

2,384,368

UNITED STATES PATENT OFFICE 2,384,368

COMBUSTION OF HALOGENATED ORGANIC VAPORS

Harold W. Crouch, Rochester, N. Y., and Henry Emanuel Stauss, Millburn, N. J., assignors to Baker & Company, Inc., Newark, N. J., a corporation of New Jersey Application April 15, 1943, Serial No. 483,216

5 Claims. (Cl. 23—219)

This invention relates in general to the combustion of organic vapors and is directed in particular to the combustion of halogenated organic vapors. The invention deals more specifically with the combustion of halogenated organic vapors in the analysis of the composition thereof, primarily for purposes of determining the approach of explosive conditions in gaseous mixtures containing such vapors.

The combustion of halogenated, for instance chlorinated, organic vapors liberates the corrosive halogen and is, normally, accompanied by the formation of water and slight quantities of corrosive acid, such as hydrochloric acid in the case of chlorinated organic vapors.

This application is a continuation in part of our application Serial No. 314,524 filed January 18, 1940.

As the combustion of the halogenated organic vapor takes place at elevated temperature, the corrosive effect of the wet halogen is tremendous and no satisfactory metallic container or oven has yet been devised to withstand such corrosion by halogen in the presence of moisture.

It is one object of this invention to provide a metallic container or vessel capable of successfully withstanding the attack of corrosive wet halogen. It is another object of this invention to provide such container or vessel for the combustion of halogenated organic vapors. It is a further object of the invention to provide such oven for the combustion of halogenated organic vapors in connection with the analysis of such organic vapors in gaseous mixture, primarily for the purpose of preventing explosive conditions in such gaseous mixture. The chief object of the invention is the combustion of organic vapors containing halogen in such manner that such combustion may be carried out in an electrically heated oven without interference by early destruction of such furnace or the formation of undesirable compounds of halogen and the metal of such furnace.

Other objects, advantages and results of the invention will appear from the following description and the accompanying drawing which constitutes a schematic elevational sectional view of the combustion vessel according to our invention.

It is common practice in many manufacturing processes to employ chlorinated or other halogenated solvents. Vapors of such solvents when mixed with air may form explosive mixtures. In order to control the admixture of air and such vapors, a sample of the mixture is withdrawn continuously and after burning is analyzed for the resultant carbon dioxide content by means of thermal conductivity methods, the carbon dioxide content then being calculated back to the carbon content of the original mixture in a determination of whether or not dangerous conditions exist therein. In the manufacture of various coatings there are frequently used, for instance, such chlorinated solvents as ethylene dichloride or propylene dichloride and the like. The gaseous mixture to be burnt contains the halogenated solvent in vapor form admixed with air and other vapors among which water vapor is most frequently met with. Upon combustion of the organic vapor there is liberated the halogen constituent of the organic vapor and such halogen is contained in a mixture of water vapor and acid, such as hydrochloric acid in the case of organic vapors containing chlorine. Such mixture is highly corrosive, especially at the elevated combustion temperature.

In attempting to devise a satisfactory method of burning halogenated organic vapors we experimented with an elongated heated tubular oven constructed of platinum, but we found that such oven is completely unsatisfactory in that the free wet chlorine attacks the walls of the platinum vessel and in that accumulated condensation of the corrosion products at the cooler parts of the oven tended to create clogging of the tubular passageway of the oven sufficient to interfere with the free flow of the gas mixture. This quick corrosion of platinum by the wet chlorine at elevated temperature was surprising in that platinum chloride is unstable at the temperature of the combustion and it had been thought, see for instance U. S. Patent No. 2,104,741, that a metal the halogen compound of which is unstable at the temperature at which the contact between the halogen and such metal takes place would be especially suited to withstand corrosion by such halogen. In the experiment we chose platinum, as other noble metals do not seem to possess sufficiently attractive qualifications, gold for instance having a melting point too low for the elevated temperature prevailing in the combustion of such organic vapors.

We have found that the combustion of organic vapors containing halogen may be carried out successfully in an oven of an alloy of platinum with at least one metal of the group consisting of rhodium, iridium, and ruthenium, and that the containers constructed of such alloy are capable of successfully resisting the chemical attack by wet chlorine at any temperature, even at elevated temperature. The discovery was particularly surprising in that the chlorides of rhodium, iridium and ruthenium are stable at temperatures in excess of the dissociation temperature of platinum chloride. We are unable on the basis of our experiments to state why a combustion vessel of platinum is quickly corroded under the conditions stated, whereas a combustion vessel of platinum alloyed with rhodium, ruthenium or iridium is capable of substantially resisting such corrosion, although it would appear, likewise on the basis of our experiments, that stability of metal chlorides or dissociation temperature thereof do not furnish any explanation, so that the reason for the superior performance of the oven of platinum alloyed with a metal of the group rhodium, iridium and ruthenium must reside in some function of such alloys not heretofore recognized or appreciated.

Referring to the drawing, forming part hereof, we provide in the combustion of halogenated organic vapors an elongated vessel A, for instance of tubular shape, constructed of an alloy of platinum and at least one metal of the group rhodium, iridium and ruthenium, advantageously supported by supports 2 and 3. The vessel may be for instance six inches to eight inches in length with a wall thickness of 0.010" and an over-all diameter of approximately 0.150". The vessel A is heated, for example by an electric current from a low voltage transformer 4, the terminals of the secondary winding of which are connected to the metallic supports 3, thus creating a furnace which in the present instance is about four inches to five inches in length. In a gaseous mixture of ethylene dichloride and air, the lower explosive limit lies at about five percent (5%) by volume of ethylene dichloride in the mixture. In practice such mixture usually contains some water vapor for instance in the neighborhood of about three percent (3%) by volume. A mixture containing for instance less than five percent (5%) of volume of ethylene dichloride is drawn into the vessel A at 5, at a velocity of for instance 150 cc. per minute. When the mixture reaches the heated part of the vessel A at 6, the carbon of the ethylene dichloride is burned to carbon dioxide. The ignition point is reached at about 400° C. and it has been found that at the center of the heated part of vessel A, approximately at 8, the temperature reaches 900° C. Beyond this center part at 8 the temperature falls and reaches considerably lower temperatures at 9. In the combustion of ethylene dichloride two reactions apparently take place simultaneously:

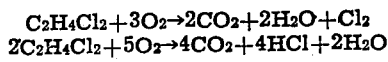

$$C_2H_4Cl_2 + 3O_2 \rightarrow 2CO_2 + 2H_2O + Cl_2$$
$$2C_2H_4Cl_2 + 5O_2 \rightarrow 4CO_2 + 4HCl + 2H_2O$$

The resulting gaseous mixture will, therefore, contain carbon dioxide, water vapor, hydrochloric acid and free chlorine. From the amount of carbon dioxide in the resulting gaseous mixture it is a simple and known procedure to calculate the ethylene dichloride content of the original mixture and to determine whether the mixture is safe from explosion or whether explosive conditions are being approached. After the ethylene dichloride has thus been burned in vessel A the mixture is passed out at the end 7, and analyzed for carbon dioxide after removal of water, hydrochloric acid and chlorine by means of calcium chloride or other agent.

The above specific example will illustrate the general method of burning halogenated organic vapors and the problem incident thereto. In our experiment above referred to with a combustion vessel of platinum, shaped and dimensioned like that referred to in the drawing, the chlorine attacked the wall a short distance from the entrance to the oven, as at 8 in the drawing, and formed platinum compounds which volatilized and condensed at cooler parts of the oven, as at 9, whereby clogging of the tubular vessel occurred which interfered with the flow of the gas mixture. As distinguished therefrom the combustion of a like halogenated organic vapor in accordance with the invention in a combustion vessel of platinum alloy described took place substantially without corrosion of the wall of the combustion vessel and without clogging of the tubular passageway. In fact, corrosion of the oven wall is decreased to such an extent that the amount of platinum metal compound found in the calcium chloride dryer, positioned between the combustion vessel and gas analysis apparatus, in the case of the present invention, is only $\frac{1}{10}$ or less, of the amount of platinum compound found in the dryer when a platinum combustion vessel is used.

The alloy of platinum with at least one metal of the group rhodium, iridium and ruthenium utilized in the construction of the vessel described should contain at least about 70% platinum to which the metal of the group rhodium, iridium and ruthenium is alloyed in amounts not exceeding about 30%. It will be understood that the platinum alloy may contain more than one metal of the group rhodium, iridium and ruthenium, and that, likewise, the alloy may further contain small quantities of other metals so long as such other metals do not substantially affect the characteristic properties of the fundamental alloy of platinum and at least one metal of the group rhodium, iridium and ruthenium. One specific alloy found particularly desirable is the alloy of platinum and rhodium, and we recommend especially the alloy of 90% platinum and 10% rhodium. The content of metal of the group rhodium, ruthenium and iridium should not fall below 1% and should preferably exceed about 5%. Accordingly the vessel is formed of an alloy of from 70% to 99% platinum and 1% to 30% metal of the group rhodium, iridium and ruthenium, preferably of from 70% to 95% platinum and 5% to 30% metal of the group rhodium, iridium and ruthenium, such for instance as an alloy of 90% platinum and 10% metal of the specified group, especially rhodium.

While we have described our invention specifically with respect to the combustion of chlorinated organic vapors it will be understood that the invention applies, likewise, to the combustion of any organic materials containing chlorine, bromine, iodine, or fluorine, and is thus applicable not only to the combustion of ethylene dichloride and propylene dichloride, but also to the combustion of other chlorinated hydrocarbon compounds such as monochlorbenzene, orthodichlorobenzene, dichloroethyl ether as well as of other halogenated compounds and solvents, particularly in a method of determining the approach to explosive or otherwise dangerous conditions in mixtures containing oxygen and such compounds, in an effort to provide a safe and accurate safety device for the prevention of explosive or other dangerous conditions, and more broadly to the prevention of corrosion by gaseous mixtures of organic vapors containing halogen and water vapor.

The combustion vessel may consist throughout of the alloys specified, or it may consist of such alloys in such parts as are subject to corrosion, and consequently it should be understood that the vessel may be manufactured for instance of composite or clad metal in which only the inside consists of the alloys specified, or that only the most important part of the vessel, such as from 6 to 9 or 6 to 8 in the drawing, consists of the alloys specified, the remainder being made of platinum or other high fusing metal or alloy.

What we claim is:

1. The method of burning halogenated organic vapors adapted upon combustion to liberate halogen, comprising heating and burning a gaseous mixture of such halogenated vapor and air in a combustion vessel of platinum alloy of 70% to 99% platinum and 1% to 30% of at least one metal of the group consisting of rhodium, iridium, and ruthenium.

2. The method of burning halogenated organic vapors adapted upon combustion to liberate halogen, comprising heating and burning a gaseous mixture of such halogenated vapor and air in a combustion vessel of platinum alloy of 70% to 95% platinum and 5% to 30% of at least one metal of the group consisting of rhodium, iridium, and ruthenium.

3. The method of burning halogenated organic vapors adapted upon combustion to liberate halogen, comprising heating and burning a gaseous mixture of such halogenated vapor and air in a combustion vessel of platinum alloy of 70% to 99% platinum and 1% to 30% rhodium.

4. The method of burning halogenated organic vapors adapted upon combustion to liberate halogen, comprising heating and burning a gaseous mixture of such halogenated vapor and air in a combustion vessel of platinum alloy of about 90% platinum and about 10% rhodium.

5. The method of determining the carbon content of a gaseous mixture of halogenated organic vapor and air, comprising burning such halogenated vapor of said mixture in a combustion vessel of platinum alloy of 70% to 99% platinum and 1% to 30% of at least one metal of the group consisting of rhodium, iridium, and ruthenium with the formation of free halogen, carbon dioxide and water, and subsequently determining the carbon dioxide content so formed.

HAROLD W. CROUCH.
HENRY EMANUEL STAUSS.